(12) United States Patent
Tinari

(10) Patent No.: US 6,446,625 B1
(45) Date of Patent: Sep. 10, 2002

(54) SOLAR ENERGY COLLECTION SYSTEM AND FLUID CONDUIT THEREFOR

(75) Inventor: Paul D. Tinari, Coquitlam (CA)

(73) Assignee: Advance Technologies Limited, Central (HK)

( * ) Notice: Subject to any disclaimer, the term of this patent is extended or adjusted under 35 U.S.C. 154(b) by 0 days.

(21) Appl. No.: 09/627,161

(22) Filed: Jul. 27, 2000

(51) Int. Cl.[7] ................................................. F24J 2/26
(52) U.S. Cl. ........................ 126/617; 126/643; 126/664; 126/673; 165/48.2
(58) Field of Search ................................. 126/617, 569, 126/646, 643, 664, 665, 673, 651, 667, 669, 671, 670, 672; 404/71; 165/168, 48.2, 46, 56, 47

(56) References Cited

U.S. PATENT DOCUMENTS

| | | | |
|---|---|---|---|
| 2,505,622 A | | 4/1950 | McKee |
| 4,037,652 A | * | 7/1977 | Brugger ........................ 126/643 |
| 4,132,074 A | * | 1/1979 | Wendel ........................ 126/561 |
| 4,164,933 A | * | 8/1979 | Alosi ........................... 126/621 |
| 4,898,153 A | * | 2/1990 | Sherwood ..................... 126/673 |
| 5,178,485 A | | 1/1993 | Katsuragi et al. |
| 5,308,187 A | | 5/1994 | Nix |
| 5,575,276 A | * | 11/1996 | Fossum et al. .............. 126/670 |

* cited by examiner

Primary Examiner—Sara Clarke
(74) Attorney, Agent, or Firm—Nath & Associates PLLC; Harold L. Novick

(57) ABSTRACT

A solar energy collection system that can be retrofitted into pavement covered lots, such as macadam covered parking lots has a pump and heat exchanger, and a conduit buried below the pavement surface that contains a heat transfer fluid such as water. The conduit has a hollow unitary, one piece casing with an oval cross section and an internal divider that divides the interior of said casing into two passageways having substantially the same cross sectional area. Heat conducting fins preferably made of copper are mounted on the casing and extend coaxially outwardly in opposite directions therefrom along the major oval axis.

18 Claims, 2 Drawing Sheets

SOLAR ENERGY COLLECTION SYSTEM AND FLUID CONDUIT THEREFOR

FIELD OF THE INVENTION

This invention relates to a solar energy collection systems in general and to a solar energy collection system which can be retrofitted in existing paved areas, such as parking lots that are covered with a covering or pavement conventionally known as "black-top or "macadam," which is a pavement made of layers of compacted broken stone, sand, or other aggregates and usually bound with tar or asphalt so that it has a black color.

BACKGROUND OF THE INVENTION

At the present time there exists a very large number of black-topped or paved areas that are only being used for storing objects such as parking lots that have a macadam paving. These paved areas could be used for other purposes, such as serving as an alternative, simultaneous purpose of collecting solar energy. In North America alone, the efficient collection of even a fraction of the solar energy incident on parking lots would reduce energy consumption by several thousand barrels of imported oil per day. However, there is no technology being used to harness the enormous amount of solar energy that is incident every day on such lots.

With the recent rise in crude oil prices, there is once again a global imperative to significantly increase the efficiency of energy use and to maximize the use of various alternate energy technologies. The enormous quantity of solar energy falling on, or incident on, parking lots can be considered to be a massive unexploited resource. Therefore there is a need for an economical, inexpensive and easy to install system that can be retrofitted into existing parking lots which are exposed to the sun to capture, collect and store or utilize the lost solar energy that is incident on unused sections of such parking lots.

SUMMARY OF THE INVENTION

The present invention has a principle objective of collecting huge amounts of currently lost solar energy by utilizing the heat energy absorbed by existing parking lots that are covered in a black top or macadam pavement. Another principle objective of the present invention is to have a solar heat collection system that can be retrofitted into existing parking lots at a minimal amount of expense with a maximum amount of return.

An advantage of the present invention is that the technology can be easily and inexpensively retrofitted into existing parking lots thereby providing a massive dedicated solar energy collection surface without disturbing the primary use of the area, which is to store objects, such as automobiles. Because there are currently hundreds of thousands of parking lots that would be suitable for being retrofitted with the current invention, the present invention should result in the savings of huge amounts of monies while providing a heat collection system whose return on investment can continue for decades after its installation.

In a currently preferred embodiment of the present invention, there is provided a solar energy collection system that can be retrofitted into existing paved areas with a covering such as macadam. Such a solar energy collection system comprises a heat collection area, a pump, a heat exchanger, and a heat collection conduit connected in a loop. The heat collection conduit comprises a first tubing for containing an effluent fluid, a second tubing integral with said first tubing for containing an influent fluid, and a first heat collection fin and a second heat collection fin physically attached to said first and second tubing, respectively.

BRIEF DESCRIPTION OF THE DRAWINGS

The present invention will become better understood by reference to the following drawings, wherein.

DETAILED DESCRIPTION OF THE PRESENTLY PREFERRED EMBODIMENT

Figure 1:
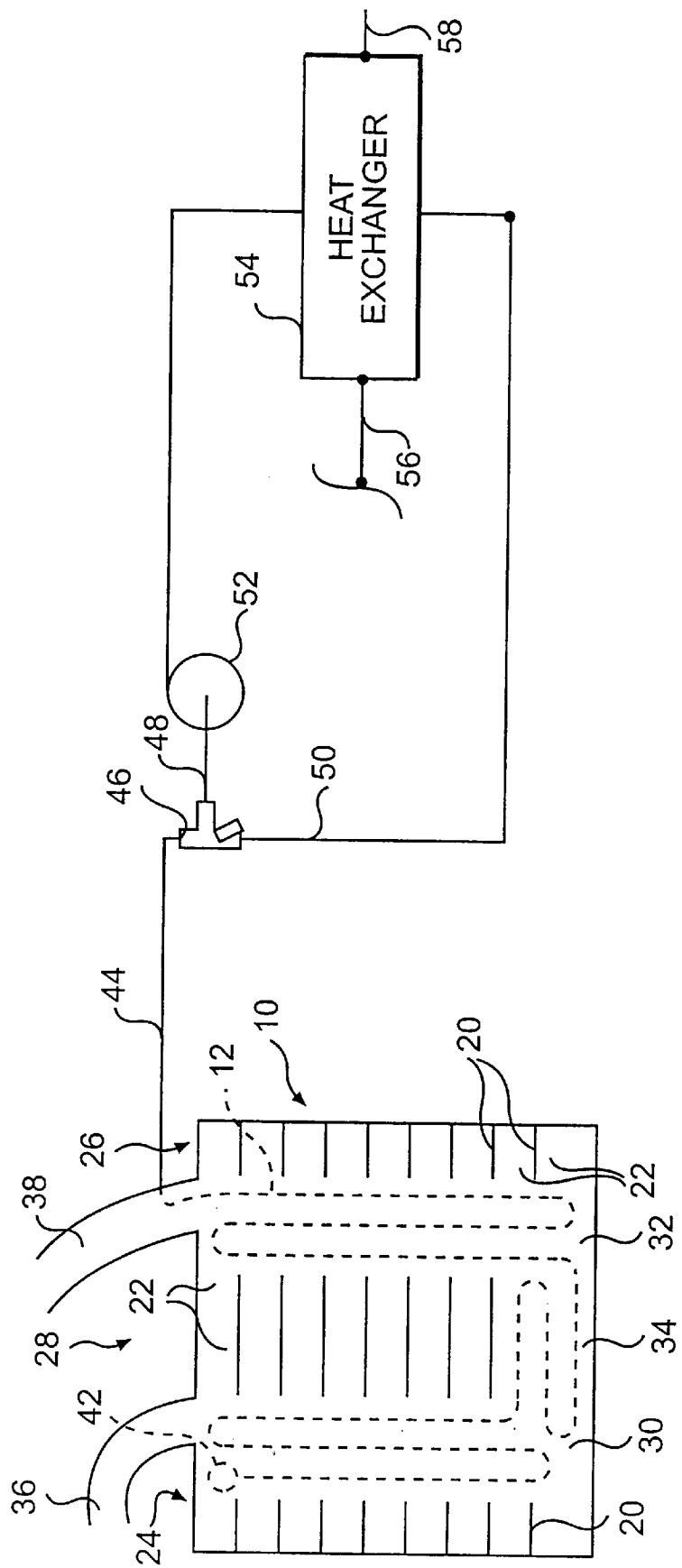
FIG. 1 is an elevational schematic piping diagram of a solar collection system in accordance with the present invention.

The foregoing and other aspects and attendant advantages of the present invention will become more readily appreciated from the following description of a presently preferred embodiment thereof with reference to the accompanying drawings, wherein like reference characters designate like parts throughout the several views. With reference now in particular to FIG. 1, an exemplary piping flow diagram of a solar energy collection system according to the present invention is depicted in which an environmentally exposed area, such as a parking lot 10 includes a dual flow conduit 12 (indicated by dashed lines) located beneath the surface of parking lot 10. Parking lot 10 preferably has a black-top or macadam pavement 14 (shown only in FIG. 2) which presents a black surface to the sun and thus a colored surface that is capable of capturing the maximum amount of solar heat. Alternatively, parking lot 10 could have a conventional concrete pavement or a conventional plasticized pavement such as used on racing tracks.

Parking lot 10 is provided with conventional lining 20 that indicates the individual car parking spaces 22. In parking lot 10, the exemplary lining provides two end columns 24 and 26 of parking spaces 22 and a central double column 28 of parking spaces 22. The columns defined between each end column 24 and 26 and central double column 28 are roads 30 and 32 which provide access to individual ones of lined parking spaces 22 in each parking column. A path 34 is provided between the end of central double column 28 and an edge of lot 10, and permits access between roads 30 and 32. An inlet road 36 and an outlet road 38 respectfully connect with roads 30 and 32 and respectfully provide ingress and egress to lot 10.

As mentioned above, dual flow conduit 12 is buried beneath the surface of parking lot 10. Conduit 12 has a terminal portion 42 located at the connection of inlet road 36 to parking lot 10. Conduit 12 has an exemplary serpentine pattern with a plurality of loops in roads 30 and 32 and connecting path 34, which pattern provides a greater efficiency of heat collection. However, as would be obvious to those skilled in the art, any pattern could be used that would maximize heat collection while minimizing installation and operating costs. In the embodiment of FIG. 1, conduit 12 pattern is depicted only in those areas of parking lot 10 in which cars would not be parked, namely in the access roads, so that the maximum amount of heat could be collected in a minimum area. Obviously, when cars are parked in parking spaces 22, the solar rays for the sun are occluded, thereby minimizing the amount of available heat. Accordingly, in one maximizing pattern of conduit 12, no portion of conduit 12 is covered by a parked vehicle.

A dual flow connecting conduit 44 is connected at one end to dual conduit 12 and is connected at the other end to a divider 46. Divider 46 divides dual flow connecting conduit 44 into two separate, single flow pipes, an effluent pipe 48 and an influent pipe 50. Connecting conduit 44 can be of the same type of conduit as conduit 12 and which while not depicted buried in FIG. 1, can also be buried beneath the surface of the ground. Effluent pipe 48 is connected at the other end to the suction of a pumping means, such as a single conventional centrifugal pump 52. Obviously, the pumping means can be a plurality of pumps in parallel and can be driven by conventional means such as an electric motor or a turbine engine. The discharge of pump 52 is connected to the input of one side of a conventional heat exchanger 54. The output of the one side of heat exchange 54 is connected to divider 46 with influent pipe 50. The other side of heat exchanger 54 has an influent pipe 56 and an effluent pipe 58, and these can be connected to any heat receiving means that is conventionally used in a solar heat system. As only one such example, the heat receiving means can be a preheater for a conventional domestic or commercial hot water system. Alternatively, heat exchanger 54 can be the actual user of the heat, such as a radiator in a building. Thus, the term heat exchanger is used broadly.

Figure 2:
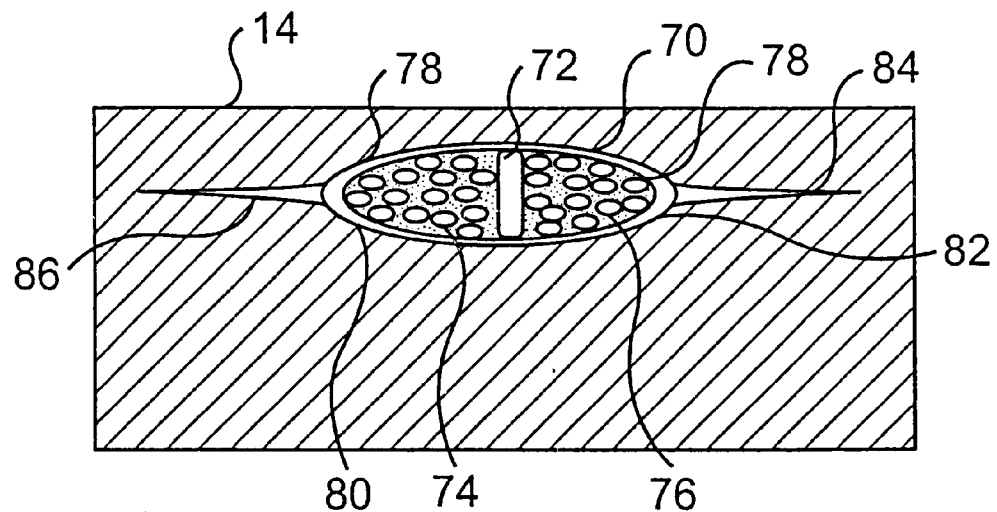
FIG. 2 is a schematic cross sectional view of a heat collecting, integral conduit.

With reference now to FIG. 2, dual flow conduit 12 is depicted as being buried in a macadam pavement 14 and is comprised of a single, one piece, integral casing 70 and an internal divider 72 which separates casing 70 into a first passageway 74 and a second passageway 76. A heat transfer fluid 78 is shown as completely filling both passageway 74 and passageway 76. As depicted in FIG. 2, casing 70 has an oval cross section with a major axis and a minor axis, and has a first end section 80 and a second end section 82. Casing 70 is equally divided in cross sectional area between first passageway 74 and second passageway 76 by divider 72 which extends vertically (as depicted in FIG. 2) along the minor axis of oval casing 70. Integrally mounted to first and second end sections 80 and 82, respectively, are outwardly extending fins 84 and 86.

Casing 70 is preferably made of a conventional, moldable or extrudable polymer plastic that can withstand the heat from the sun, is chemically compatible with pavement 14, and will retain its shape at the various pressures to which it would be exposed from fluid 78. It should also have a relatively high thermal conductivity so that it can transfer heat absorbed from the sun by pavement 14 to fluid 78. Divider 72 is preferably made of the same polymer plastic of which casing 70 is made. Fluid 78 can be any conventional environmentally compatible fluid, which is preferably water. Fins 84 and 86 are rigidly attached to casing 70 by means such as a conventional adhesive so that conduit 12 can be laid as a single composite unit, similar to conventional techniques used to lay electrical or fiber optic cables. Fins 84 and 86 extend coaxially along the major axis of oval shaped casing 70 and have a thin triangular cross section, and are preferably made of a high heat conducting material, such as copper or other metal which has a high thermal conductivity, is economical, is chemically compatible with pavement 14, and will not deteriorate when buried. It should also be flexible so that conduit 12 can be more easily handled. Exemplary dimensions of conduit 12 are as follows. Casing has a preferable major diameter of 3 to 5 inches, a minor diameter of one to two inches, and a thickness of 2 to 5 mils. Divider 46 has a preferable thickness of 10 to 15 mils. Fins 82 and 84 have a length of 3 to 5 inches and a thickness at the base of 6 to 15 mils.

Figure 3:
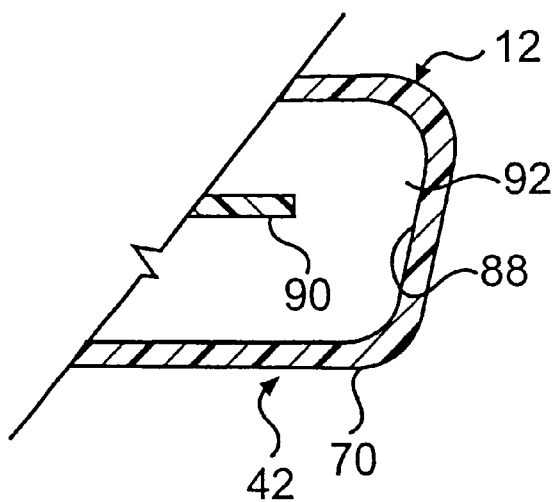
FIG. 3 is a plan, schematic sectional view of the end portion of the conduit depicted in FIG.

Referring to FIG. 3, terminal portion 42 of dual flow conduit 12 is schematically depicted. Conduit casing 70 has an end 88 and divider 72 has a terminal end 90 that is spaced from casing end 88 an amount approximately equal to the width of first and second passage ways 74 and 76, thereby defining a cross-connecting channel 92. With channel 92 having a width of at least this dimension, there is less turbulence of fluid 78 in terminal portion 42 as it flows from first passageway 74 to second passageway 76. By using a single dual flow conduit, the laying of conduit 12 is much easier and less expensive than if two separate conduits were used.

Conduit 12 can be easily retrofitted in the pavement of existing macadam parking lots in any desired pattern, such as the depicted serpentine pattern. All that need be done is to use conventional road repair machinery to dig a trench about one inch wider than the width of conduit 12, including fins 84 and 86 and from about 2 inches to about 6 inches deep. Then conduit 12 is inserted or laid in the trench and the trench is filled with new macadam. Macadam is both relatively easy to apply and relatively inexpensive. In addition, the new macadam will readily mate with the inserted conduit 12 so that a good physical thermal contact is made therewith. Also the new macadam will seal with the old macadam so that there will be little visual effect of the trench pattern.

In use, fluid 78 is continuously circulated by pump 52 through heat exchanger 54 and thence effluent pipe 48 and connected first passageway 74 of conduit 12. Fluid 78 while in conduit 12 picks up heat by convection from surrounding pavement 14, which in turn was heated by the sun. Fluid 78 reaches terminal portion 42 and leaves first passageway 74 and enters second passageway 76 through channel 92, where it continues to pick up heat and is returned to pump 52. Heat exchanger 54 removes the solar generated heat and transfers it to a secondary fluid flowing through influent and effluent pipes 56 and 58.

Although the preferred embodiments of the present invention have been disclosed for illustrative purposes, those skilled in the art will appreciate that various modifications, additions and substitutions are possible without departing from the scope and spirit of the invention as disclosed in the accompanying claims.

I claim:

1. A solar energy collection system in an area exposed to the sun and having a pavement, the solar energy collection system comprising
   a pump having a suction and a discharge;
   a heat exchanger;
   a pipe in fluid communication between said pump and heat exchanger; and
   a fluid containing, dual flow conduit buried in the area pavement, said conduit comprising
     a hollow unitary casing divided into two passageways, a first passageway in fluid communication with said pump suction and a second passageway in fluid communication with said pump discharge, and
     a channel connecting said first and second passageways of said conduit.

2. The solar energy collection system as claimed in claim 1 wherein said casing is an integral one piece having an internal divider.

3. The solar energy collection system as claimed in claim 1 wherein said fluid is water.

4. The solar energy collection system as claimed in claim 1 wherein said casing is an integral one piece having an internal divider and wherein said casing has an oval cross section with a major axis and a minor axis, said divider divides the interior of said casing into two substantially equal sections along the minor axis; and wherein said conduit further comprises copper fins extending coaxially outwardly from said casing along said major axis of said oval casing.

5. A solar energy collection system in an area exposed to the sun and having a pavement, the solar energy collection system comprising a pump having a suction and a discharge;

a heat exchanger;

a pipe in fluid communication between said pump and heat exchanger; and a fluid containing, dual flow conduit buried in the area pavement, said conduit comprising a hollow unitary casing divided into two passageways, a first passageway in fluid communication with said pump suction and a second passageway in fluid communication with said pump discharge, wherein said casing is an integral one piece having an internal divider and has an oval cross section with a major axis and a minor axis; and a channel connecting said first and second passageways of said conduit.

6. The solar energy collection system as claimed in claim 5 wherein said conduit further comprises fins extending outwardly from said casing.

7. The solar energy collection system as claimed in claim 6 wherein said fins are made of a metal.

8. The solar energy collection system as claimed in claim 6 wherein said fins are made of copper.

9. The solar energy collection system as claimed in claim 8 wherein said fins extend coaxially along said major axis of said oval casing.

10. The solar energy collection system as claimed in claim 5 wherein the internal divider divides the interior of said casing into two substantially equal sections along the minor axis.

11. The solar energy collection system as claimed in claim 10 wherein said casing is made of a polymer plastic.

12. The solar energy collection system as claimed in claim 10 wherein said conduit further comprises heat conducting fins extending outwardly from said casing along said major axis thereof.

13. A solar energy collection system in an area exposed to the sun and having a pavement, the solar energy collection system comprising a pump having a suction and a discharge;

a heat exchanger;

a pipe in fluid communication between said pump and heat exchanger; and a fluid containing, dual flow conduit buried in the area pavement, said conduit comprising a flexible one-piece tubing unit having two passageways, a first passageway in fluid communication with said pump suction and a second passageway in fluid communication with said pump discharge, and a channel connecting said first and second passageways of said tubing unit.

14. The solar energy collection system as claimed in claim 13 wherein said tubing unit consists of two passageways, a first passageway in fluid communication with said pump suction and a second passageway in fluid communication with said pump discharge.

15. The solar energy collection system as claimed in claim 13 wherein said conduit further comprises fins extending outwardly from said tubing unit.

16. The solar energy collection system as claimed in claim 15 wherein said fins are made of a metal.

17. The solar energy collection system as claimed in claim 15 wherein said fins are made of copper.

18. The solar energy collection system as claimed in claim 13 wherein said fluid is water.

* * * * *